United States Patent
Joo

(10) Patent No.: US 6,249,884 B1
(45) Date of Patent: Jun. 19, 2001

(54) APPARATUS AND METHOD FOR SEARCHING FOR DEFECTIVE ADDRESSES OF A RECORDING MEDIUM

(75) Inventor: Tae-shik Joo, Kunpo (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/187,396

(22) Filed: Nov. 6, 1998

(30) Foreign Application Priority Data

Nov. 11, 1997 (KR) .................................................. 97-59282
May 25, 1998 (KR) .................................................. 98-18829

(51) Int. Cl.$^7$ ...................................................... G06F 11/00
(52) U.S. Cl. ............................................. 714/42; 711/112
(58) Field of Search ................................. 714/42, 43, 44, 714/54, 5, 6, 7, 25; 711/112, 114, 100

(56) References Cited

U.S. PATENT DOCUMENTS

| | | | |
|---|---|---|---|
| 5,146,571 | * | 9/1992 | Logan .................................. 395/400 |
| 5,202,876 | * | 4/1993 | Takagi et al. ........................... 369/58 |
| 5,235,585 | | 8/1993 | Bish et al. .............................. 369/54 |
| 5,237,553 | * | 8/1993 | Fukushima et al. .................... 369/58 |
| 5,271,018 | * | 12/1993 | Chan .................................... 371/10.2 |
| 5,319,627 | * | 6/1994 | Shinno et al. ......................... 369/54 |
| 5,404,357 | | 4/1995 | Ito et al. .............................. 371/21.2 |
| 5,526,335 | * | 6/1996 | Tamegai ................................. 369/58 |
| 5,541,903 | | 7/1996 | Funahashi et al. ..................... 369/54 |
| 5,974,544 | * | 10/1999 | Jeffries et al. ............................ 713/1 |
| 5,983,309 | * | 11/1999 | Atsatt et al. ............................. 711/4 |
| 6,101,619 | * | 8/2000 | Shin ...................................... 714/710 |
| 6,185,058 | * | 2/2001 | Dobbek et al. ......................... 360/48 |

* cited by examiner

Primary Examiner—Nadeem Iqbal
(74) Attorney, Agent, or Firm—Mills & Onello, LLP

(57) ABSTRACT

An apparatus and method for searching for defective address of a recording medium are provided. The recording medium includes a main data storage unit and a defective data management unit having at least one defect management area including first and second defect lists, and repeatedly records and reproduces. The method of the invention includes the steps of (a) searching for a defect-correctable defect management area of the defective data management unit, performing correction of defects, and writing a defect map table showing the number of data units and the number of accumulated data units in the first and second defect lists of each group, (b) recording data in the defect-correctable defect management area which was searched for, (c) calculating a temporary physical address by inputting the position of data whose real address is to be searched for, as a logical block address, (d) determining a corresponding group using the temporary physical address and determining the range of a searching address of the corresponding group in the defect map table, (e) searching for the first and second defect lists of the defect management area recorded in the step (a), setting the first and second defect lists as input information, and calculating a real physical address by one-half dividing the temporary physical address calculated in the step (c), and (f) calculating a real data address from the real physical address.

17 Claims, 13 Drawing Sheets

APPARATUS AND METHOD FOR SEARCHING FOR DEFECTIVE ADDRESSES OF A RECORDING MEDIUM

BACKGROUND OF THE INVENTION

1. Field of the Invention

The present invention relates to recording media, and more particularly, to an apparatus and method for searching for defective addresses of recording media.

2. Description of the Related Art

With a recent trend to high-capacity recording media, many efforts have been made to utilize a structure in which defective recording locations are replaced by other recording locations. The recording medium is comprised of sectors which store and record data on their surfaces, and defects of the sectors are tested while manufacturing the recording medium.

Defective sectors cannot store data. The list for defective sectors is called a "primary defect list" (hereinafter called PDL). The PDL is stored at a predetermined location on a disk.

The recording medium is provided with additional sectors to replace the defective sectors. Defects of these extra sectors are called "secondary defects", and extra sectors with such defects are classified in a "secondary defect list" (hereinafter called SDL).

When a driver having recording media is powered up, the PDL and SDL are read out and stored in a random access memory (RAM). A controller such as a microprocessor prevents data from being recorded on the defective sectors, using information on the PDL and SDL.

A recording medium such as a digital versatile disc (DVD) RAM, which repeatedly records and reproduces, first searches the defect list before recording or reproducing data. However, the defect list is very large, typically on the order of about 64 Kbytes. Accordingly, it takes much time to search the entire defect list and recover from defects.

SUMMARY OF THE INVENTION

To solve the above problem, it is an object of the present invention to provide an apparatus and method for effectively searching for defective addresses in a recording medium.

Accordingly, to achieve the above and other objects, there is provided an apparatus and method of searching for defective addresses of a recording medium which has a main data storage unit and a defective data management unit having at least one defect management area including first and second defect lists, and repeatedly records and reproduces. The method includes the steps of (a) performing correction of defects by searching for a defect-correctable defect management area of the defective data management unit; (b) recording data in the defect-correctable defect management area which was searched for; © calculating a temporary physical address by inputting the position of data whose real address is to be searched for, as a logical block address; (d) searching for the first and second defect lists of the defect management area recorded in the step (a), setting the first and second defect lists as input information, and calculating a real physical address by one-half dividing the temporary physical address calculated in the step (c); and (e) calculating a real data address from the real physical address.

In one embodiment, step (d) comprises the substeps of: (d1) calculating a first preliminary address by adding the total number of data units of a replaced group to the number of data addresses in an auxiliary area of the second defect list; (d2) comparing the first preliminary address to the temporary physical address; (d3) searching for the second defect list and obtaining the real physical address using a one-half dividing method, when the first preliminary address is greater than or equal to the temporary physical address; and (d4) searching for the first defect list and obtaining the real physical address using a one-half dividing method, when the first preliminary address is smaller than the temporary physical address.

In one embodiment, the step (d3) comprises the substeps of: (d3a) determining whether the first preliminary address is larger than the temporary physical address; (d3b) tracking a replacement address equal to the temporary physical address, using the consecutive one-half dividing method, when the first preliminary address is larger than the temporary physical address; and (d3c) tracking a real physical address corresponding to the replacement address, wherein when the first preliminary address is smaller than or equal to the temporary physical address, the first preliminary address becomes the replacement address.

Under another aspect of the invention, there is provided another method of searching for defective addresses of a recording medium which has a main data storage unit and a defective data management unit having at least one defect management area including first and second defect lists, and repeatedly records and reproduces. The method includes the steps of: (a) searching for a defect-correctable defect management area of the defective data management unit, performing correction of defects, and writing a defect map table showing the number of data units and the number of accumulated data units in the first and second defect lists of each group; (b) recording data in the defect-correctable defect management area which was searched for; © calculating a temporary physical address by inputting the position of data whose real address is to be searched for, as a logical block address; (d) determining a corresponding group using the temporary physical address and determining the range of a searching address of the corresponding group in the defect map table; (e) searching for the first and second defect lists of the defect management area recorded in the step (a), setting the first and second defect lists as input information, and calculating a real physical address by one-half dividing the temporary physical address calculated in the step (c); and (f) calculating a real data address from the real physical address.

In accordance with another aspect of the invention, there is provided a processor for controlling a recording medium having a main data storage unit and a defect data management unit for recording already-generated defects, comprising: a memory management unit for recording and storing data in the main data storage unit; a defect management unit having first and second defect lists for managing defects of the main data storage unit; a defect check unit which can communicate with the memory management unit, for checking the defects of main data of the main data storage unit via the first and second defect lists of the defect management unit; and a data sensing unit for processing data of the recording medium and communicating with the memory management unit and the defect management unit, wherein the defect check unit obtains a temporary physical address by receiving a logical block address at the position of data whose real physical address is to be searched for, and calculates a real physical address by setting the first and second defect lists as input information and performing a one-half dividing method on the temporary physical address.

In accordance with still another aspect of the invention, there is provided another processor for controlling a recording medium having a main data storage unit and a defect data management unit for recording defects which are already generated, comprising: a memory management unit for recording and storing data in the main data storage unit; a defect management unit having first and second defect lists for managing defects of the main data storage unit; a defect check unit which can communicate with the memory management unit, for checking a corresponding area to search for the defects of main data of the main data storage unit via a defect map table showing the first and second defect lists of the defect management unit, the number of data units in the first and second defect lists in each group, and the number of accumulated data units; and a data sensing unit for processing data of the recording medium and communicating with the memory management unit and the defect management unit, wherein the defect check unit obtains a temporary physical address by receiving a logical block address at the position of data whose real address is to be searched for, and calculates a real physical address by setting the first and second defect lists as input information and performing a one-half dividing method on the temporary physical address.

According to the method of searching for defective addresses and the data processor for controlling the above method of the present invention, the addresses of defective data can be quickly found.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF THE PREFERRED EMBODIMENTS

Attached drawings illustrating preferred embodiments of the present invention will aid in understanding of the merits and objects of the present invention.

The apparatus and method of the present invention are applicable to all kinds of recording media which repeatedly record and reproduce, but the present specification describes only a digital versatile disc (DVD) as a representative recording medium for the sake of convenient explanation.

Figure 1:
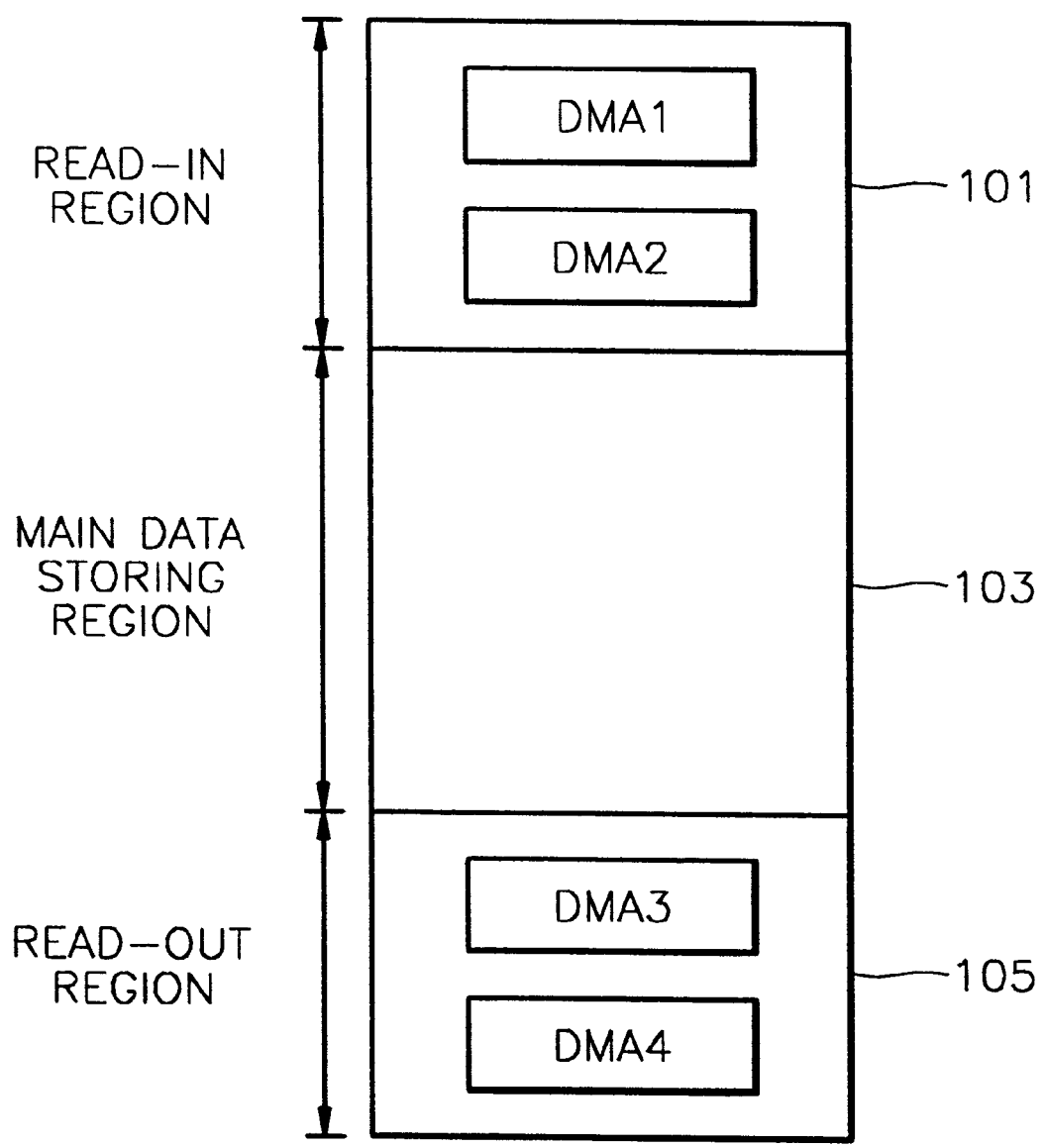
FIG. 1 is a schematic block diagram illustrating the data structure of a digital versatile disc.

Referring to FIG. 1, the DVD is comprised of a read-in region 101, a main data storing region 103, and a read-out region 105. The read-in region 101 is an auxiliary region which marks the beginning of the main data storing region. The main data storing region 103 records and stores main data applied from an external source. The read-out region 105 is an auxiliary region which indicates the end of the main data storing region. The read-in and read-out regions 101 and 105 each have defect management areas (DMA) 102. That is, the read-in region 101 has DMA1 102A and DMA2 102B, and the read-out region 105 has DMA3 102C and DMA4 102D.

Table 1 shows the structure of the main data storing region 103 on the basis of a DVD-RAM format 0.9 draft version. Here, h denotes a hexadecimal number, and LBA is a logical block address.

TABLE 1

|  | address of start sector | number of sectors of start buffer | number of data blocks | number of spare sectors | number of sectors of end buffer | LBA of start sector (data field number) |
|---|---|---|---|---|---|---|
| group 0 | 31000h | — | 1662 | 1360 | 48 | 0h(31000h) |
| group 1 | 37D60h | 48 | 2010 | 1728 | 48 | 67E0h(377E0h) |
| . | . | . | . | . | . | . |
| group 7 | 70880h | 48 | 2682 | 2304 | 48 | 3C2A0h(6D2A0h) |
| group 8 | 7B980h | 64 | 2792 | 2400 | 64 | 46A40h(77A40h) |
| . | . | . | . | . | . | . |
| group 15 | D5F00h | 64 | 3576 | 3072 | 64 | 9C2C0h(CD2C0h) |
| group 16 | E4B00h | 80 | 3686 | 3168 | 80 | AA240h(DB240h) |
| . | . | . | . | . | . | . |
| group 22 | 146DE0h | 80 | 4358 | 3744 | 80 | 107180h(138180h) |
| group 23 | 158D80h | 80 | 4475 | 3840 | — | 1181E0h(1491E0h) |

Referring to Table 1, the main data storing region 103 is comprised of 24 data storage groups, and the address of a start sector of each group is indicated. Each of the data storage groups has start buffer sectors, data blocks, spare sectors, and end buffer sectors. The first group 0 has no start buffer sectors, and the last group 23 has no end buffer sectors. The address of a start sector of main data of the group 0 is 31000h.

Figure 2:
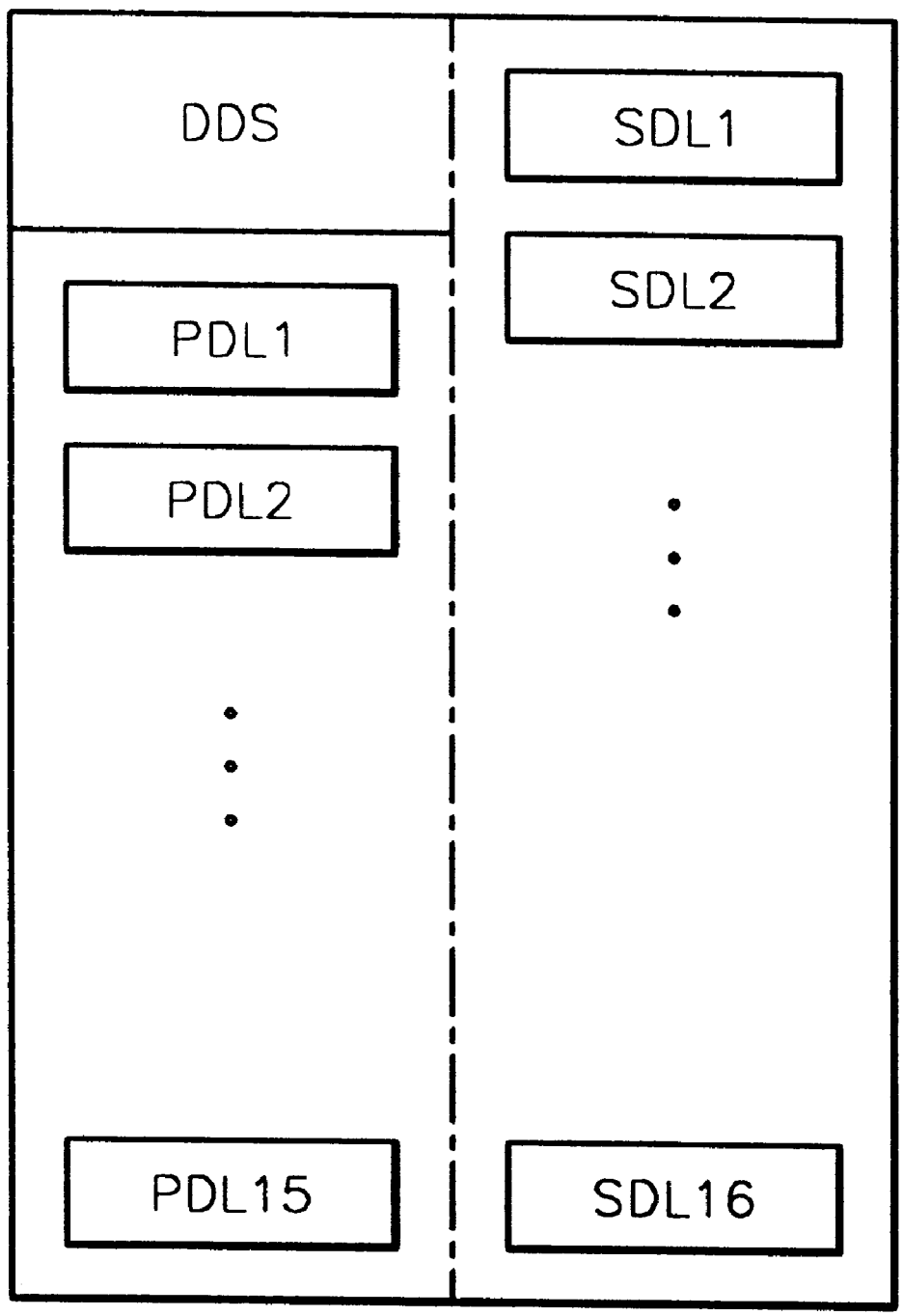
FIG. 2 is a schematic block diagram illustrating the data structure of a DMA.

FIG. 2 shows the data structure of the DMA 102 on the basis of the DVD_RAM format 0.9 draft version. Referring to FIG. 2, the data structure of the DMA has a disc definition structure (DDS) sector 106, 15 PDL sectors 108, and 16 SDL sectors 110. The DDS region 106 includes a DDS definition line, an initialization indication line, a data group display line, and PDL and SDL start address display lines.

The DDS definition line indicates the DDS region. The initialization indication line indicates that the DVD is in an initialized state. The data group display line displays the number of data groups existing in the data storing region. The PDL start address display line displays a start address of a PDL. The SDL start address indication line displays a start address of an SDL.

The PDL region, used when the DVD is initialized, has 15 PDL sectors 108. The first PDL (PDL1) records a PDL definition indicating the PDL region, a PDL address number indication displaying the number of PDL addresses recorded in the PDL list, and defective addresses which record the addresses of first through 511th defective sectors in the data storing region 103. The other PDLs, PDL2 through PDL16, record the addresses of defective sectors. PDL2 through PDL15 each sequentially have 512 defective address record lines. When the DVD is in an initialized state, the defects of the data storing region 103 are generated in units of one sector. Here, the generated defects are processed by a slipping replacement method. That is, input data skips the defective sector and is continuously stored in the next sector. When a defective sector is generated while data is stored up to the last sector in each group, data is recorded on a sector in a spare region.

The SDL region, used upon normal recording and reproduction, has 16 SDL sectors. The first SDL (SDL1) records an SDL definition indicating the SLD region, an indication character indicating a block which used all the spare sectors, the number of SDL writings to count replaced SDL sectors, the addresses of blocks having first through 252nd defects in the main data storing region 103, and the addresses of replaced blocks. The residual SDLs, i.e., SDL2 through SDL16, record the addresses of defective blocks and the addresses of replaced blocks. SDL2 through SDL15 each sequentially record the addresses of 256 defective blocks and the addresses of 256 replaced blocks. Defects recorded in the SDL are generated in units of one block. When a defect exceeding a predetermined standard is generated in one block, it is determined that the entire block is defective. This defective block is replaced by a spare block of the spare sector region. That is, a linear replacement approach is used for replacing the defective blocks with spare blocks in the SDL region. At this time, the SDL region records the addresses of the first sectors of defective blocks, and the addresses of the first sectors of blocks replacing the defective blocks, in the spare region. In the present embodiment, data in the PDL and SDL is recorded by an address ascending method. For reference, the number of defective lists after summing the PDL and SDL is prescribed to be within 4092 in consideration of the reliability of data.

Figure 3:
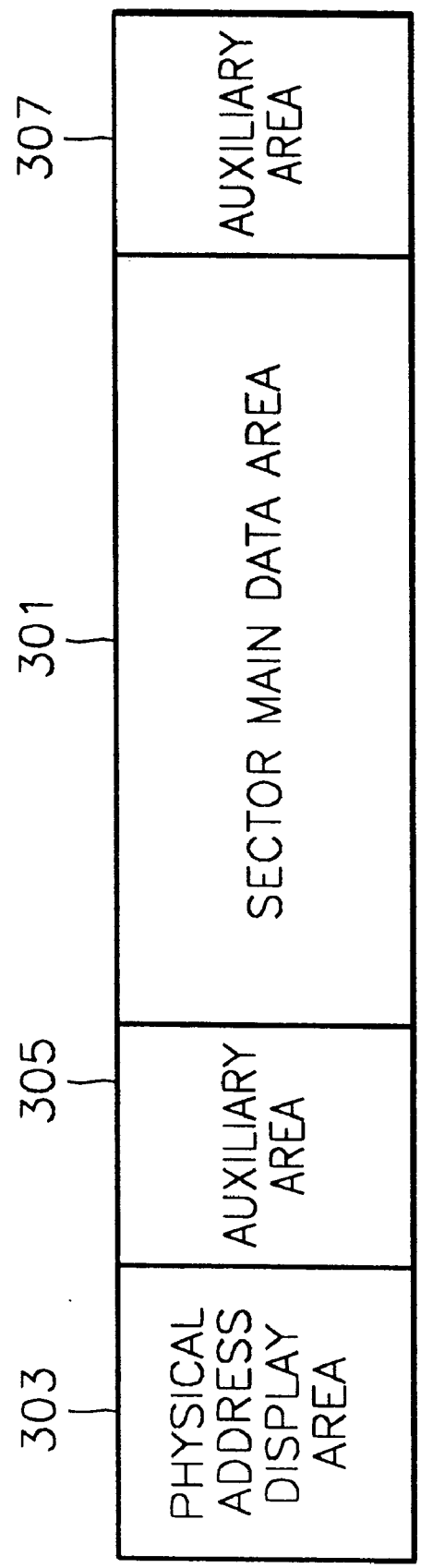
FIG. 3 is a schematic diagram illustrating the sector format of a DVD-RAM.

FIG. 3 shows a sector format of a DVD_RAM. Referring to FIG. 3, the sector format of a DVD_RAM has a sector main data area 301, a physical address display area 303, and auxiliary areas 305 and 307. The sector main data area 301 is comprised of a data address and a defect sensing code added to main data. The auxiliary areas 305 and 307 are added for data recording and reproduction.

A DVD_ROM uses only a data address to find a desired position upon reproduction. This data address also has a physical meaning. However, in the DVD_RAM as opposed to the DVD_ROM, the data address and a physical address may be different. That is, the data address, being a logical address, varies according to defects on its recording portion. Thus, the search of DVD_RAM discs must be based on the physical address.

Figure 4:
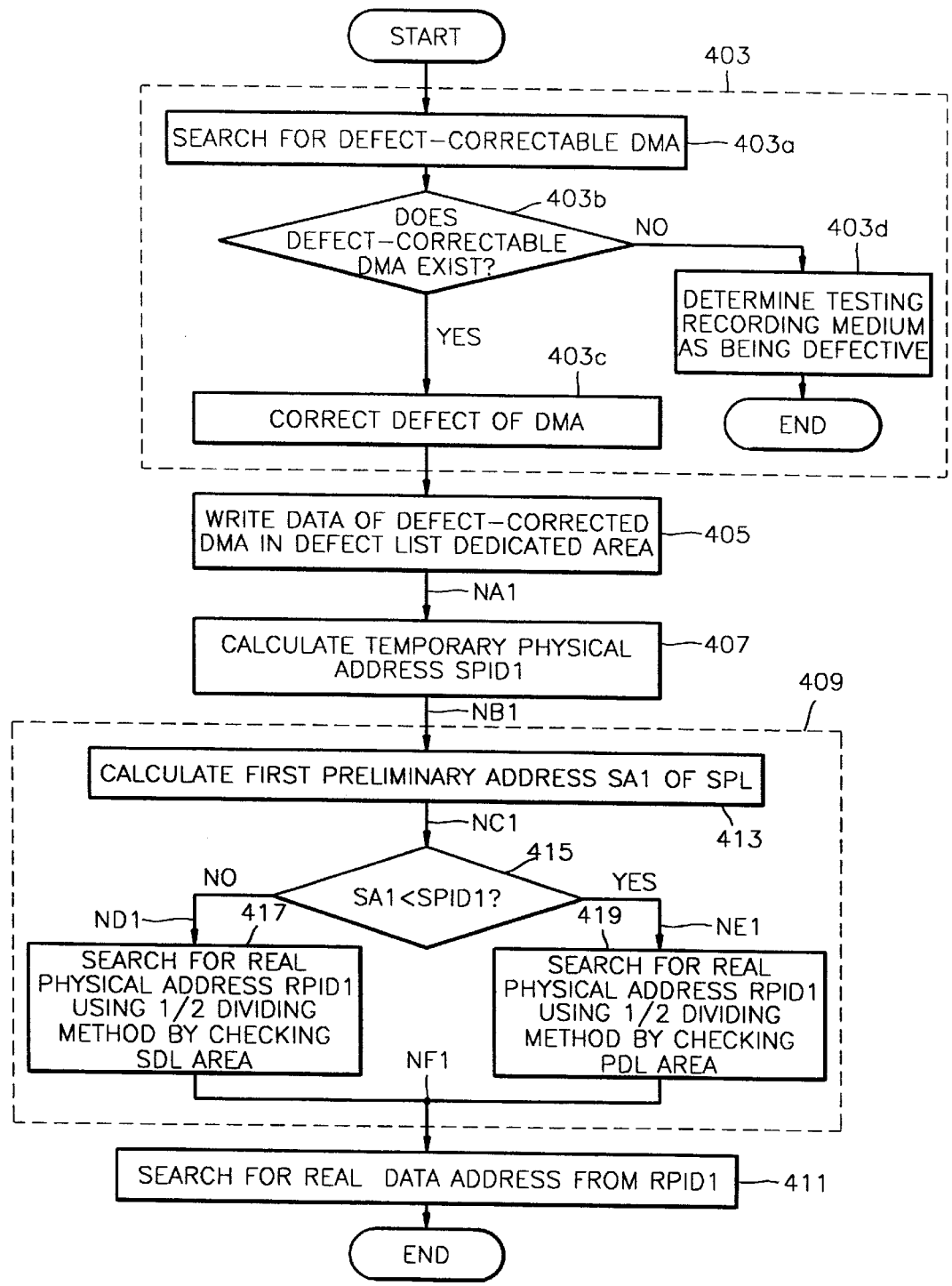
FIG. 4 is a flowchart illustrating a first embodiment of a method of determining real data addresses, according to the present invention.

FIG. 4 is a flowchart illustrating a first embodiment of a method of searching for defective addresses, according to the present invention. In one embodiment, the present invention has a defective data management unit having at least one defect management area (DMA) including the PDLs and SDLs, and a main data storing unit. The defective address searching method of the present invention includes a DMA searching step 403, a defect recording step 405, a temporary physical address calculating step 407, a real physical address calculating step 409, and a real data address determining step 411.

In the DMA searching step 403, the defective DMAs, and specifically, defective DMAs whose defects can be corrected, are located. Specifically, the DMA searching step 403 includes a search step 403a, a determination step 403b, a defect correction step 403c, and a fail conclusion step 403d. In the search step 403a, a DMA whose defect can be corrected is searched for by searching for the defect data management units 101 and 105 (see FIG. 1). In the determination step 403b, it is determined from the result of the search in search step 403a whether a DMA capable of having its defect corrected exists. If so, in the defect correction step 403c, a DMA without defects is generated by correcting the defect. In the fail conclusion step 403d, when no DMA capable of being corrected exists, a testing recording medium is determined to be defective.

When it is determined in the determination step 403b that the DMA capable of being corrected exists, the defect recording step 405 is performed after the step 403c. In the defect recording step 405, data of the defect-correctable DMA found in the DMA searching step 403 is recorded.

Figure 5:
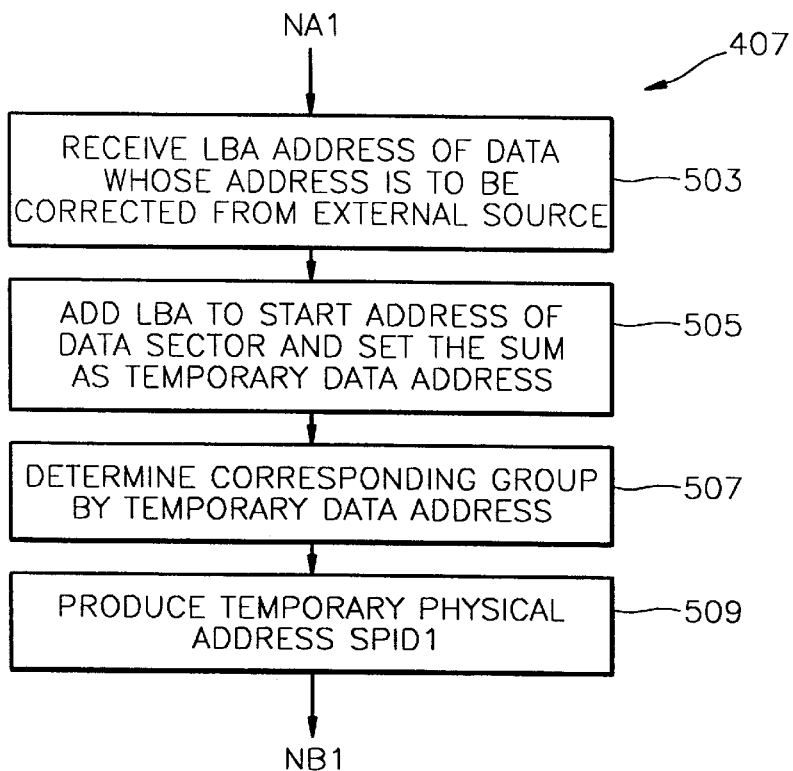
FIG. 5 is a detailed flowchart illustrating the step of calculating a temporary physical address in the method of FIG. 4.

In the temporary physical address calculation step 407, the position of data whose real address is to be searched for is input as a logical block address (LBA), and a temporary physical address SPID1 is calculated. FIG. 5 details step 407 of FIG. 4. Referring temporarily to FIG. 5, the temporary physical address calculating step 407 includes a logical block address input step 503, a temporary data address generation step 505, a corresponding group search step 507, and a temporary physical address generation step 509. In the logical block address input step 503, the LBA of data to be searched is input from an external computer. In step 505, a temporary data address PDA is generated by summing the LBA input in the logical block address input step 503 and a start address of the first block of the main data storage unit. In the present embodiment, the start address of the first block (block 0) is 31000h as shown in Table 1. Therefore, the temporary data address PDA is determined by Equation 1.

$$PDA = LBA + 31000h \quad (1)$$

In the corresponding group search step 507, a corresponding group is searched for by the PDA. In the temporary physical address generation step 509, the temporary physical address SPID1 is generated by summing the total number of auxiliary addresses existing before the corresponding group and the number of auxiliary addresses existing before the data block of the corresponding group. That is, the number (FSS) of spare sectors, the number (FSB) of start buffer sectors, the number (FFB) of end buffer sectors in all groups before the corresponding group, and the number (CSS) of start buffer sectors in the corresponding group, are added to the PDA, thus obtaining the temporary physical address SPID1. Accordingly, the temporary physical address SPID1 is determined by Equation 2.

$$SPID1=FSS+FSB+FFB+CSS+PDA \qquad (2)$$

However, the temporary physical address SPID1 is obtained under the assumption that no defects exist on a disk, so that it must be converted into a real physical address RPID1.

Again referring to FIG. 4, in the real physical address calculation step 409, the PDL and SDL in the DMA recorded in the defect recording step 405 are searched for and set as input information. In the real physical address calculation step 409, a real physical address RPID1 is calculated by dividing by 2 the temporary physical address SPID1 calculated in the temporary physical address calculation step 407.

Figure 6:
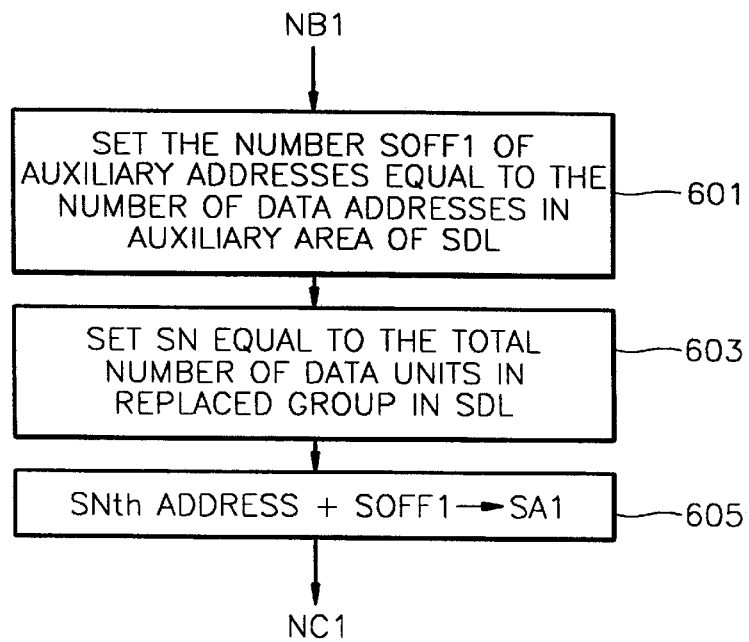
FIG. 6 is a detailed flowchart illustrating the step of calculating a first preliminary address in the method of FIG. 4.

The real physical address calculation step 409 includes a first preliminary address generation step 413, a determination step 415, an SDL search step 417, and a PDL search step 419. In the first preliminary generation step 413, the number of data addresses in the SDL auxiliary area is added to the total number of data units in a replaced group, and the sum is set as a first preliminary address SA1. FIG. 6 details the step 413 of producing a first preliminary address in the method of FIG. 4. Referring to FIG. 6, the first preliminary address generation step 413 is performed in accordance with the following description. First, in step 601, the number of data addresses in the auxiliary area is read out from an SDL and is set as the number SOFF1 of auxiliary addresses. In step 603, the total number of data units in the replaced group is set to be SN in the SDL. In step 605, SOFF1 is added to the SN-th address, and the sum becomes a preliminary address SA1.

Again referring to FIG. 4, in the determination step 415, the first preliminary address SA1 is compared to the temporary physical address SPID1. In the SDL search step 417, if the first preliminary address SA1 is larger than or equal to the temporary physical address SPID1, the SDL is searched for, and the real physical address RPID1 is obtained using a one-half dividing method. In the PDL search step 419, if the first preliminary address SA1 is smaller than the temporary physical address SPID1, the PDL is searched, and the real physical address RPID1 is obtained using a one-half dividing method. In the real data address determination step 411, a real data address RDA is searched for from the real physical address RPID1.

Figure 7:
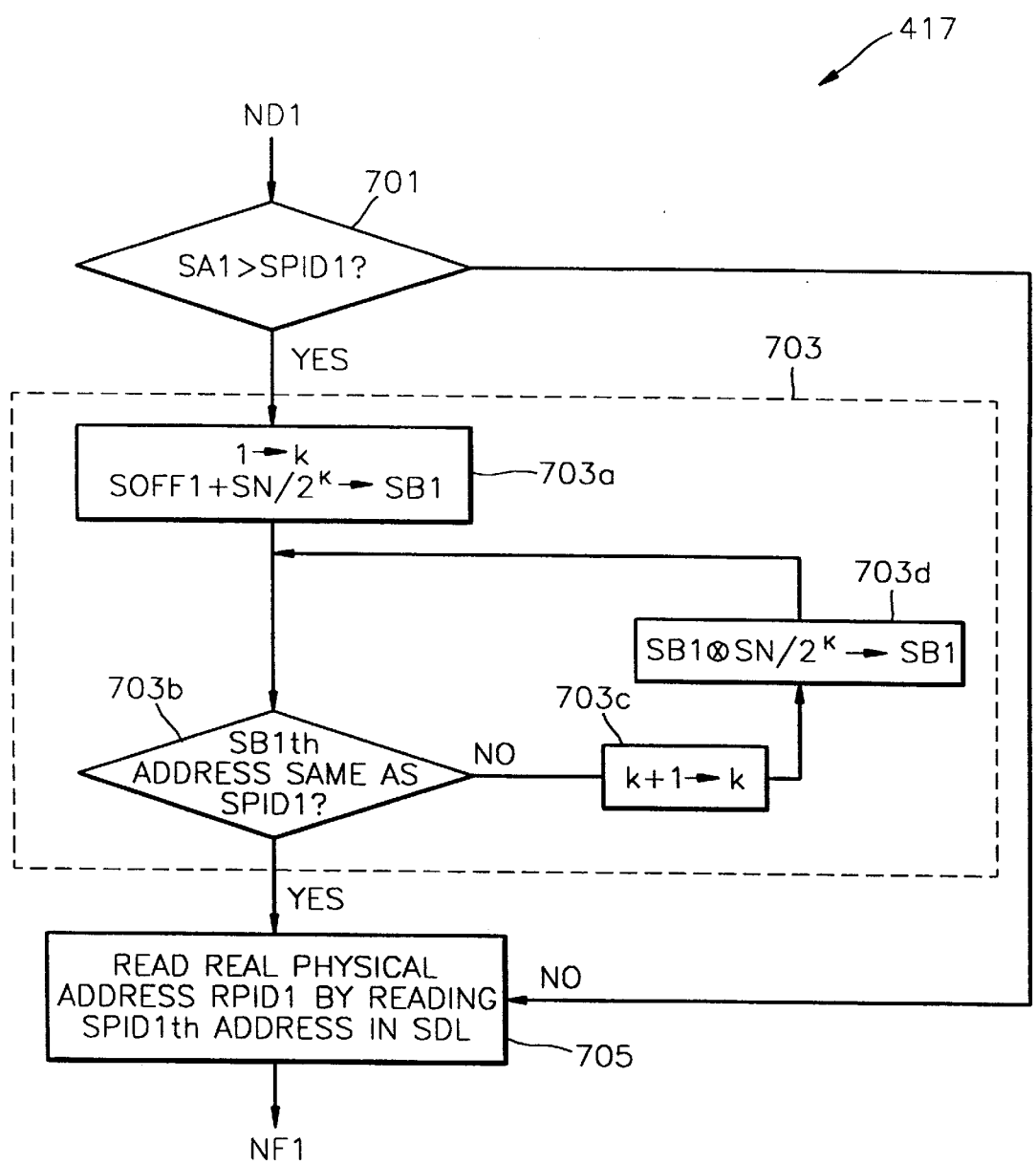
FIG. 7 is a detailed flowchart illustrating the step of searching for an SDL in the method of FIG. 4.

FIG. 7 details the step 417 of searching for an SDL in the method of FIG. 4. Referring to FIG. 7, the SDL search step 417 includes a first determination step 701, a replacement address tracking step 703, and a real physical address tracking step 705. In the first determination step 701, it is determined whether the first preliminary address SA1 is larger than the temporary physical address SPID1. In the replacement address tracking step 703, when the first preliminary address SA1 is larger than the temporary physical address SPID1, a replacement address REPAD1 having the same address as the temporary physical address SPID1 is obtained by tracking using a consecutive one-half dividing method. In the real physical address tracking step 705, a real physical address RPID1 corresponding to the replacement address REPAD1 is obtained.

If the first preliminary address SA1 is smaller than or equal to the temporary physical address SPID1, the first preliminary address SA1 becomes the replacement address REPAD1, to thus obtain a real physical address RPID1.

More specifically, the replacement address tracking step 703 is performed according to the following description.

First, SOFF1 and $SN/2^K$ are summed, and the sum becomes SB1, in step 703a. Here, the initial value of K is "1". It is determined whether the SB1-th address is the same as the temporary physical address SPID1, in step 703b. If the SB1-th address is not the same as the temporary physical address SPID1, k is set to k+1, in step 703c. $SN/2^K$ is added to or subtracted from SB1, and the result again becomes SB1, in step 703d. The addition or subtraction ($\otimes$) is an addition when SB1 is smaller than the temporary physical address SPID1 and a subtraction when the SB1 is larger than the temporary physical address SPID1.

Figure 8:
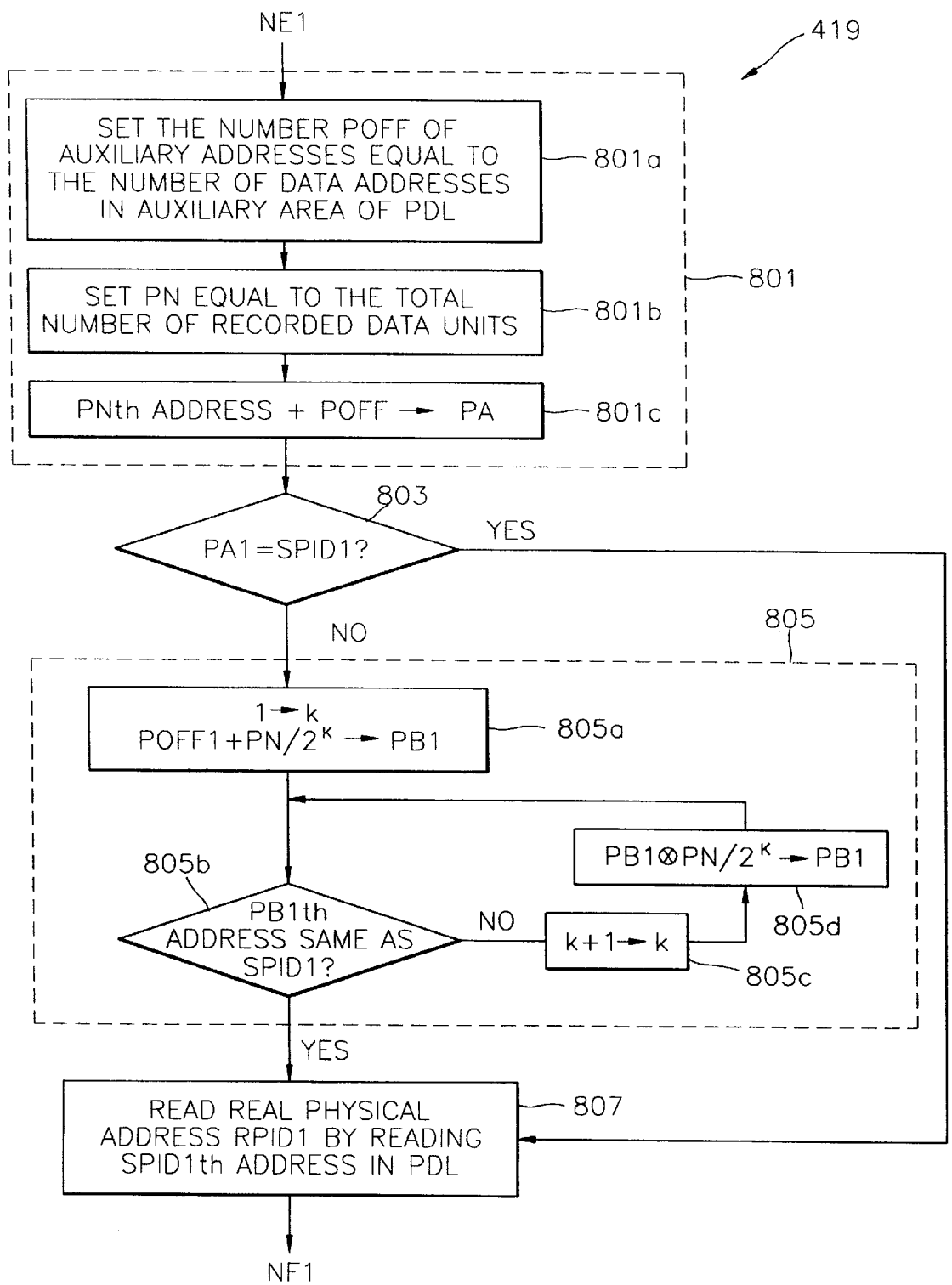
FIG. 8 is a detailed flowchart illustrating the step of searching for a PDL in the method of FIG. 4.

FIG. 8 details the step 419 of searching for a PDL in the method of FIG. 4. Referring to FIG. 8, the PDL search step 419 includes a second preliminary address generation step 801, a determination step 803, a replacement address tracking step 805, and a real physical address tracking step 807. The second preliminary address generation step 801 is performed according to the following. In step 801a, the number of data addresses existing in the auxiliary area of a first defect list PDL is set to be the number POFF of auxiliary addresses. The total number of recorded data units is set to be PN in step 801b. A second preliminary address PA1 is produced by adding the number POFF of auxiliary addresses to the PN-th address, in step 801c. Here, PN is the number of previous sectors whose defects were recorded in the first defect list PDL. In the determination step 803, it is determined whether the preliminary address PA1 is the same as the temporary physical address SPID1. In the replacement address tracking step 805, when the answer to the determination in the step 803 is "no", the replacement address REPAD1 having the same address as the temporary physical address SPID1 is tracked using a consecutive one-half dividing method. In the real physical address tracking step 807, the replacement address found in the determination step 803 or the replacement address tracking step 805 is set as the real physical address.

The replacement address tracking step 805 includes a first auxiliary operation step 805a, an auxiliary determination step 805b, and a second auxiliary operation step 805c and step 805d. In the first auxiliary operation step 805a, POFF1 is added to $PN/2^K$, and the sum is set to be PB1. Here, the initial state of k is 1. In the auxiliary determination step 805b, it is determined whether the PB1-th address is the same as SPID1. In the second auxiliary operation step, when the answer to the determination in the step 805b is "no", k is set to k+1 in step 805c. In step 805d, PB1 is added to or subtracted from $PN/2^K$, and the result becomes PB1. Here, the addition or subtraction ($\otimes$) is an addition when the PB1-th address is smaller than SPID1, and a subtraction when the PB1-th address is larger than SPID1. When the answer to the determination in the step 805b is "yes", the real physical address tracking step 807 is performed.

Specifically, the performance of the real physical address tracking step 807 falls into one of the following four cases. The first case is that the temporary physical address SPID1 does not exist in PDL and SDL and is smaller than the address of the first defect list of the PDL. Here, the real physical address RPID1 is the same as the temporary physical address SPID1.

The second case is that the temporary physical address SPID1 is larger than PA1 of the PDL. In this case, it is determined to which group data represented by PA1 belongs, among 24 DVD_RAM groups. A start sector address of a ZN-th group is again searched for from the PDL. If this address is CN1, an expression like RPID1=SPID1+PA1−CN1+1 is obtained.

The third case is that the temporary physical address SPID1 does not exist in the PDL and SDL and is smaller than the last defective address of the PDL. In this case, the replacement address tracking step 805 is repeated. The real physical address RPID1 is calculated by the same method as in the second case, by searching for a corresponding group ZN from a physical address represented by an address repeated in this case.

The fourth case is that the temporary physical address SPID1 does not exist in the SDL but exists in the PDL. In this case, an address which is searched for is called TA1, and CN1 is obtained by the same method as in the second case, thereby calculating the real physical address RPID1 using a relation expression like RPID1=SPID1+TA1−CN1+1.

Figure 9:
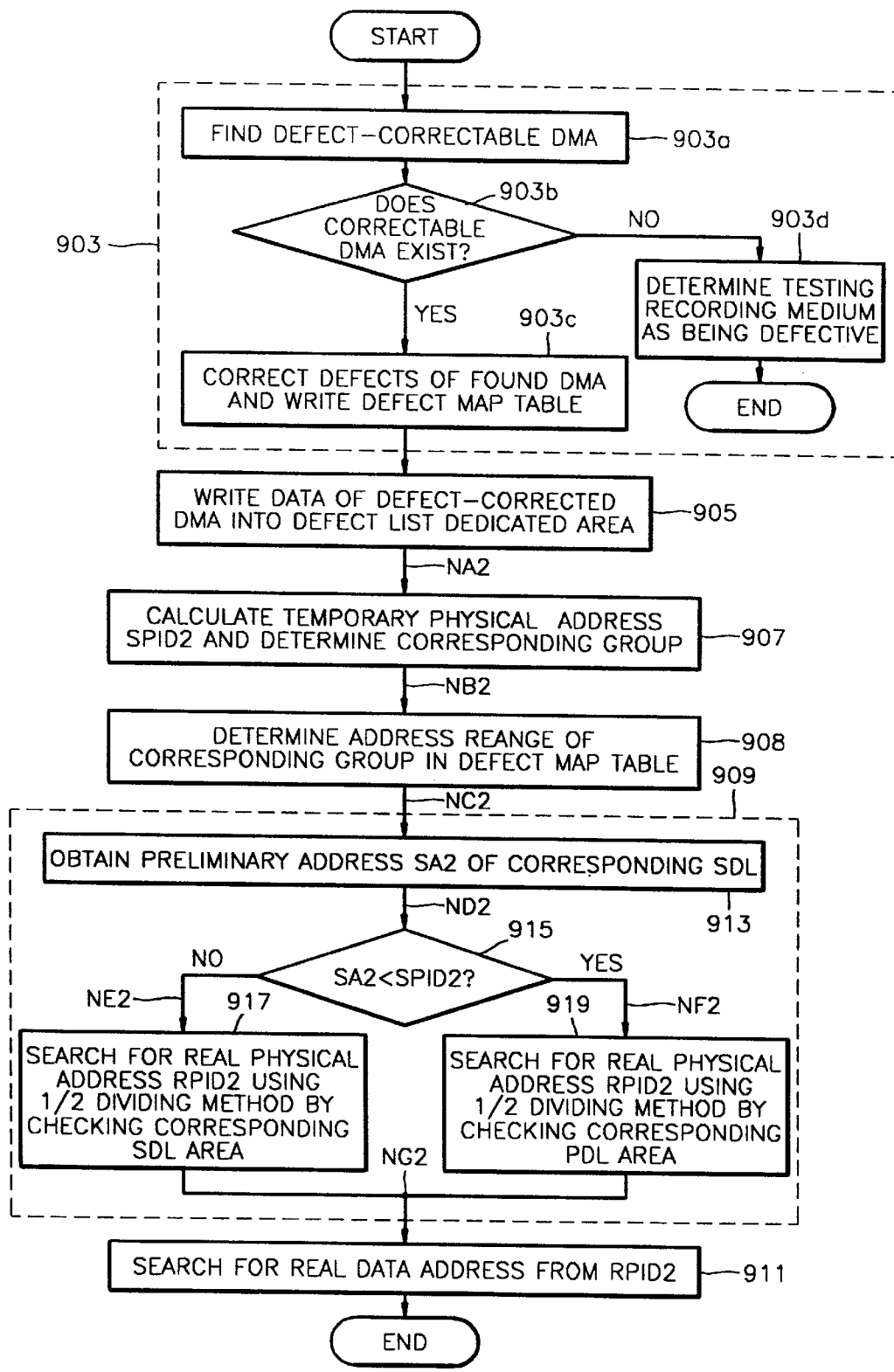
FIG. 9 is a flowchart illustrating a second embodiment of a method of determining real data addresses, according to the present invention.

FIG. 9 is a flowchart illustrating a second embodiment of a method of searching for defective addresses, according to the present invention. This method includes a DMA search step 903, a defect recording step 905, a temporary physical address calculation step 907, an address range determination step 908, a real physical address calculation step 909, and a real data address determination step 911.

The second embodiment of FIG. 9 will now be described in detail. In the interest of simplifying the description, where possible, this second embodiment is described by comparison with the first embodiment described above. The second embodiment of the present invention in comparison with the first embodiment searches for defective addresses by pre-determining a group for tracking a real physical address from the defect map table, thus significantly reducing the time for searching for the defective addresses.

The DMA search step 903 is similar to the DMA search step 403 in the first embodiment, except that a defect map table is written by finding and correcting a correctable DMA. This defect map table shows the number of each of PDL data and SDL data in each group, the number of accumulated data units, etc. An example of this detect map table is shown in Table 2.

number ASNd of accumulated SDL data in previous groups. Accordingly, APNd and ASNd in group 1 are each "0".

The defect recording step 905 is substantially the same as the defect recording step 405 of FIG. 4, in which data is recorded in the defect-correctable DMA searched for in the DMA search step 903.

Figure 10:
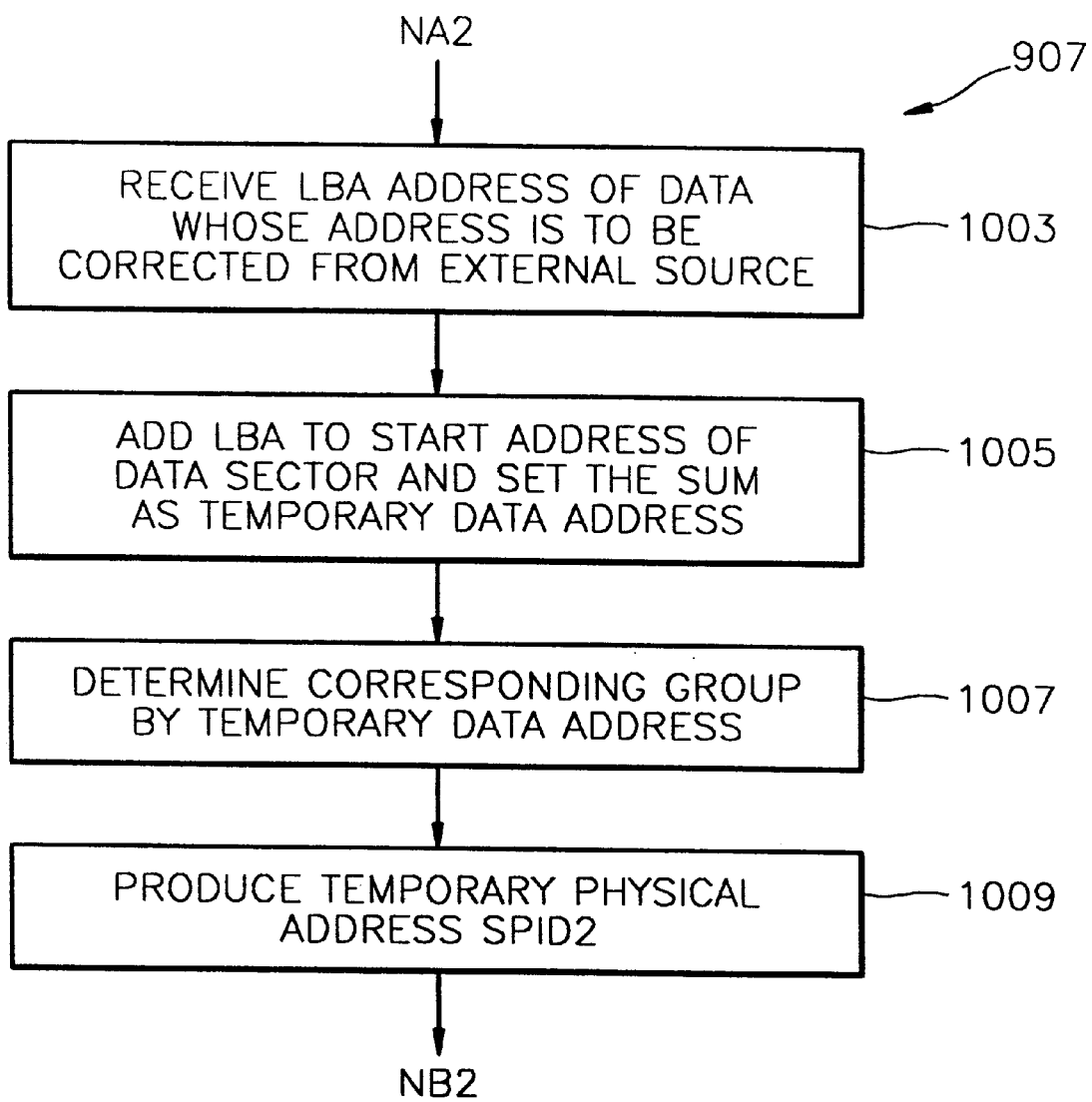
FIG. 10 is a detailed flowchart illustrating the step of calculating a temporary physical address in the method of FIG. 9.

FIG. 10 details the step 907 of calculating a temporary physical address in the method of FIG. 9. Referring to FIG. 10, the temporary physical address calculation step 907 includes a logical block address input step 1003, a temporary data address generation step 1005, a corresponding group search step 1007, and a temporary physical address generation step 1009. The step 907 is substantially the same as the temporary physical address calculation step 507 of FIG. 5 except that a temporary physical data address SPID2 in the temporary physical address generation step 1009 is determined by the following Equation 3:

$$SPID2 = Zss + Zbb + (LBA - LBAz), \quad (3)$$

wherein Zss represents the address of a start sector in a corresponding group Zd, Zbb represents the number of sectors of a start buffer, LBA denotes a logical block address input from a host computer, and LBAz is the logical block address of the start sector in the corresponding group.

Referring again to FIG. 9, the address range determination step 908 is for determining a search address range SADR in a corresponding group (group d) in the defect map table. Here, the search address range SADR is determined by $(SOFF2+ASNd*y)-(SOFF2+ASNd*y+SNd*y)$. Here, SOFF2 denotes the number of data addresses in the auxiliary area of a corresponding SDL, and y denotes the number of addresses occupied by a piece of data.

The real physical address calculation step 909 is almost the same as the real physical address calculation step 409 in the first embodiment, and is for calculating a real physical

TABLE 2

| | address of start sector | number of data units in corresponding group PDL | number of accumulated PDL data units | number of data units in corresponding group SDL | number of accumulated SDL data units | LBA of start sector (data field number) |
|---|---|---|---|---|---|---|
| group 0 | 31000h | PN0 | APN0 = 0 | SN0 | ASN0 = 0 | 0h(31000h) |
| group 1 | 37D60h | PN1 | APN1 = PN0 | SN1 | ASN1 = SN0 | 67E0h(377 E0h) |
| group 2 | 40220h | PN2 | APN2 = APN1 + PN1 | SN2 | ASN2 = ASN1 + SN1 | E580h(3F5 80h) |
| group 3 | 48E40h | PN3 | APN3 = APN2 + PN2 | SN3 | ASN3 = ASN2 + SN2 | 16A20h(47 A20h) |
| group 4 | 521C0h | PN4 | APN4 = APN3 + PN3 | SN4 | ASN4 = ASN3 + SN3 | 1E5C0h(50 5C0h) |
| . | . | . | . | . | . | . |
| group d | | PNd | APNd = APN(d − 1) + PN(d − 1) | SNd | ASNd = ASN(d − 1) + SN(d − 1) | . |
| . | . | . | . | . | . | . |
| group 16 | 1355A0h | PN21 | APN21 = APN20 + PN20 | SN21 | ASN21 = ASN20 + SN20 | F6820h(12 7820h) |
| group 22 | 146DE0h | PN22 | APN22 = APN21 + PN21 | SN22 | ASN22 = ASN21 + SN21 | 107180h(1 38180h) |
| group 23 | 158D80h | PN23 | APN23 = APN22 + PN22 | SN23 | ASN23 = ASN22 + SN22 | 1181E0h(1 491E0h) |

Referring to Table 2, the defect map table includes the number PNd of PDL data units in a corresponding group (in this specification, called "group d"), the number APNd of accumulated PDL data units in previous groups, the number SNd of SDL data units in a corresponding group, and the address RPID2 by one-half dividing the temporary physical address SPID2 calculated in the temporary physical address calculation step 907. The real physical address calculation step 909, including a first preliminary address generation step 913, a determination step 915, an SDL search step 913, and a PDL search step 915, is substantially the same as step 409 in the first embodiment of FIG. 4, except that a preliminary address SA2 in a corresponding SDL in the first preliminary address generation step 913 becomes SOFF2+ASNd*y+SNd*y.

Figure 11:
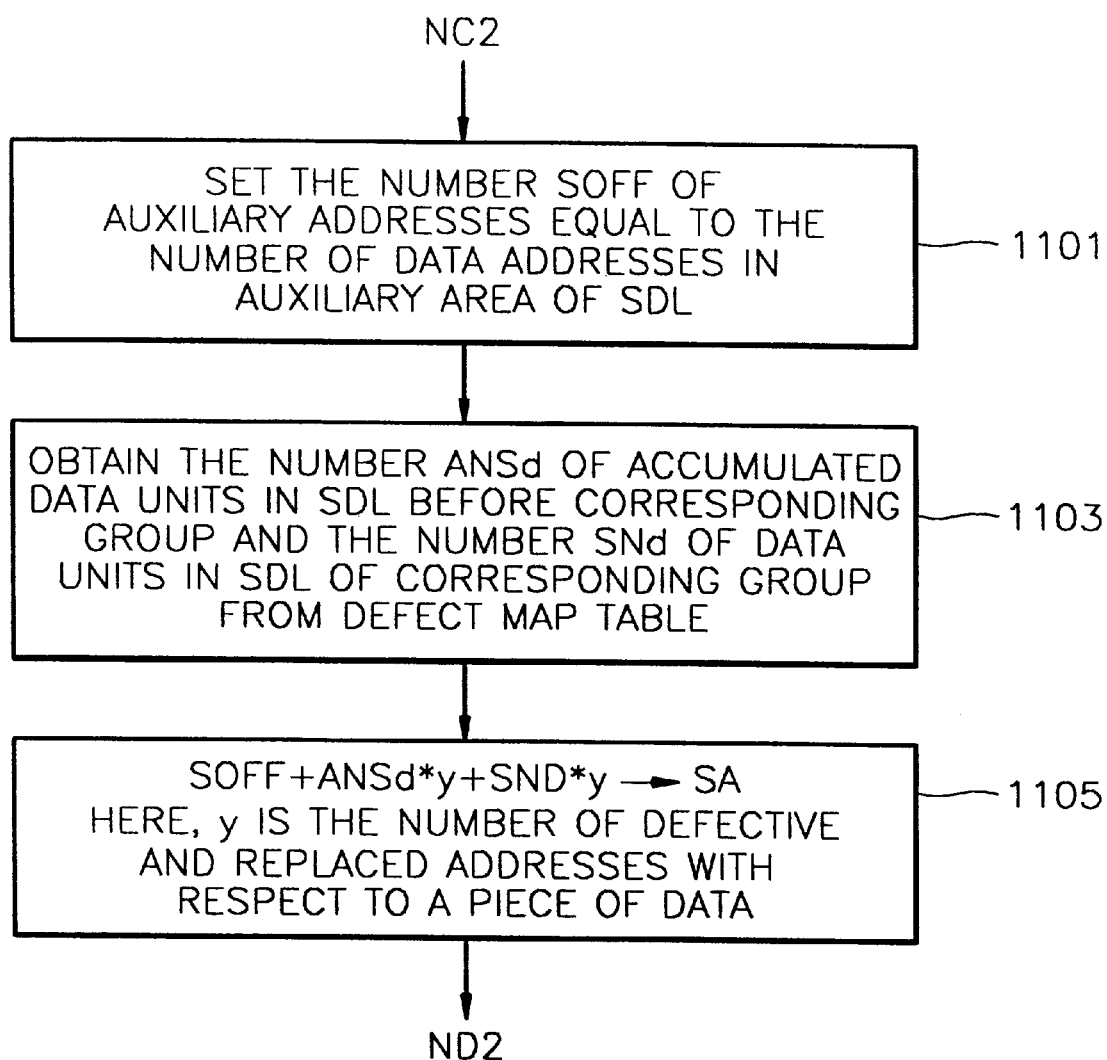
FIG. 11 is a detailed flowchart illustrating the step of obtaining a first preliminary address in the method of FIG. 9.

FIG. 11 details the step 913 of producing a first preliminary address in the method of FIG. 9. The first preliminary address generation step 913 will now be described referring to FIG. 11. First, in step 1101, the number of data addresses in the auxiliary area is read from the second defect list SDL, and the read number is set to be the number SOFF2 of auxiliary addresses. In step 1103, the number ASNd of accumulated data units in the secondary defect list SDL before the corresponding group, and the number SNd of data units of SDL in the corresponding group in the defect map table are obtained. SOFF2+ASNd*y+SNd*y is calculated, and the sum is set to be a preliminary address SA2, in step 1105.

Referring back to FIG. 9, the determination step 915 compares the first preliminary address SA2 with the temporary physical address SPID2. The SDL search step 917 obtains the real physical address RPID2 by searching and one-half dividing the secondary defect list SDL when the first preliminary address SA2 is larger than or equal to the temporary physical address SPID2.

Figure 12:
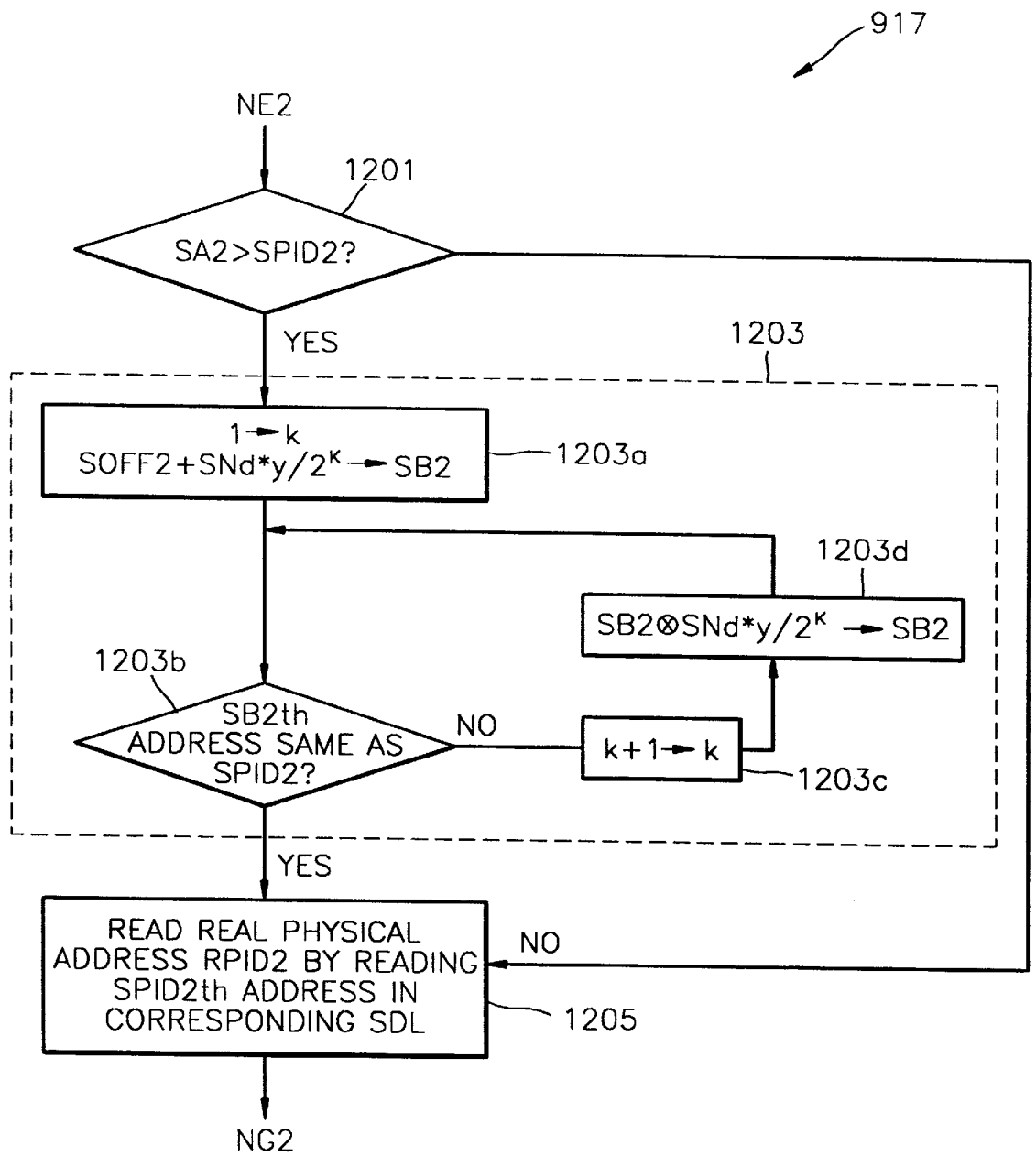
FIG. 12 is a detailed flowchart illustrating the step of searching for an SDL in the method of FIG. 9.

FIG. 12 details the step 917 of searching for an SDL in the method of FIG. 9. It includes a first determination step 1201, a replacement address tracking step 1203, and a real physical address tracking step 1205. The first predetermination step 1201 determines whether the first preliminary address SA2 is larger than the temporary physical address SPID2. The replacement address tracking step 1203 obtains the replacement address REAPAD2 having the same address as the temporary physical address SPID2 by tracking in the consecutive one-half dividing method, when the first preliminary address SA2 is larger than the temporary physical address SPID2. The real physical address tracking step 1205 obtains the real physical address RPID2 corresponding to the replacement address REAPAD2. If the first preliminary address SA2 is smaller than or equal to the temporary physical address SPID2, the first preliminary address SA2 becomes the replacement address REPAD2, thus obtaining the real physical address RPID2.

In detail, the replacement address tracking step 1203 is performed according to the following. First, SOFF2 is added to ASNd*y/$2^K$, and the sum becomes SB2 (here, the initial value of k is "1"), in step 1203a. It is determined whether the SB2-th address is equal to the temporary physical address SPID2, in step 1203b. When the SB-th address is not equal to the temporary physical address, k is set to k+1, in step 1203c. SNd*y/$2^K$ is added to or subtracted from SB2, and the result is assigned to SB2, in step 1203d. The addition or subtraction ($\otimes$) is an addition when SB2 is smaller than the temporary physical address SPID2, and a subtraction when SB2 is larger than the temporary physical address SPID2.

Figure 13:
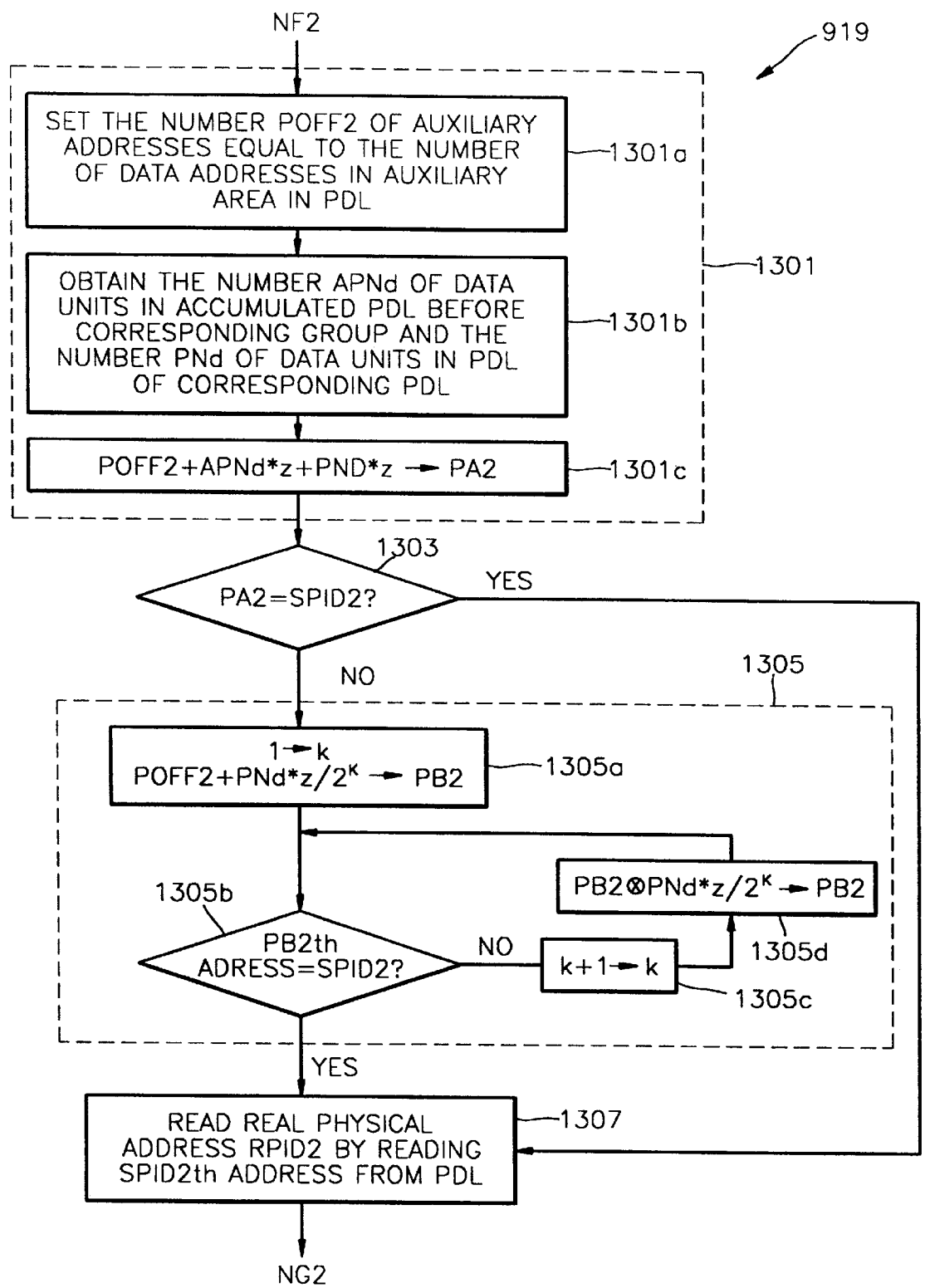
FIG. 13 is a detailed flowchart illustrating the step of searching for a PDL in the method a of FIG. 9.

FIG. 13 details step 919 of searching for a PDL in the method of FIG. 9, including a second preliminary generation step 1301, a determination step 1303, a replacement address tracking step 1305, and a real physical address tracking step 1307. In the second preliminary address generation step 1301, first, the number of data addresses existing in the auxiliary area of a PDL is set to be the number POFF2 of auxiliary addresses, in step 1301a. Then, in step 1301b, the number APNd of data units in an accumulated PDL before a corresponding group, and the number PNd of data units in a PDL of the corresponding group, are obtained from the defect map table. A second preliminary address PA2 is generated by the following Equation 4:

$$PA2 = POFF2 + APNd*z + PNd*z, \qquad (4)$$

wherein z denotes the number of defective addresses occupied by a piece of data.

The determination step 1303 determines whether the preliminary address PA2 is equal to the temporary physical address SPID2. The replacement address tracking step 1305 tracks the replacement address REPAD2 having the same address as the temporary physical address SPID2 by tracking using the consecutive one-half dividing method, when the result of the determination in the determination step 1303 is "no". The real physical address tracking step 1307 is for setting as a real physical address the replacement address found in the determination step 1303 or the replacement address tracking step 1305.

Specifically, the replacement address tracking step 1305 includes a first auxiliary operation step 1305a, an auxiliary determination step 1305b, and the second auxiliary operation step (steps 1305c and 1305d). The first auxiliary operation step 1305a adds POFF2 to PNd*z/$2^k$ and sets the sum as PB2. Here, the initial state of k is 1. The auxiliary determination step 1305b determines whether the PB2-th address is equal to the SPID2. In the second auxiliary operation step, when the result of the determination in the auxiliary determination step 1305b is "no", k is set to k+1, in step 1305c. PNd*z/$2^k$ is added to or subtracted from PB2, and the result is assigned to PB2, in step 1305d. Here, the addition or subtraction ($\otimes$) is an addition when the PB2-th address is smaller than SPID2, and a subtraction when the PB2-th address is larger than SPID2. When the result of the determination in the auxiliary determination step 1305b is "yes", the real physical address tracking step 1307 is performed.

Specifically, performance of the real physical address tracking step 1307 is classified into the following three cases. The first case is that the temporary physical address SPID2 does not exist in the PDL and SDL in the corresponding group and is smaller than an address in the first defect list of a PDL in the corresponding group. In this case, the real physical address RPID2 is equal to the temporary physical address SPID2.

The second case is that the temporary physical address SPID2 does not exist in the PDL and SDL of the corresponding group and is smaller than the last defect address of the PDL. In this case, the replacement address tracking step 1305 is repeated. In this case, if a larger address among physical addresses represented by a repeated address is set to be ZA, and a value obtained by searching for the number of sectors of a start sector address and a start buffer in the corresponding group from a corresponding PDL is set to be CN2, the real physical address RPID2 can be obtained by the following Equation 5:

$$RPID2 = SPID2 + PA2 - CN2 + 1. \qquad (5)$$

The third case is that the temporary physical address SPID1 does not exist in the SDL of the corresponding group but exists in the PDL. In this case, the address which is searched for is set to be TA2, and CN2 is obtained by the method of the second case, thus obtaining a real physical address using a relation expression like RPID2=SPID2+TA2−CN2+1.

Figure 14:
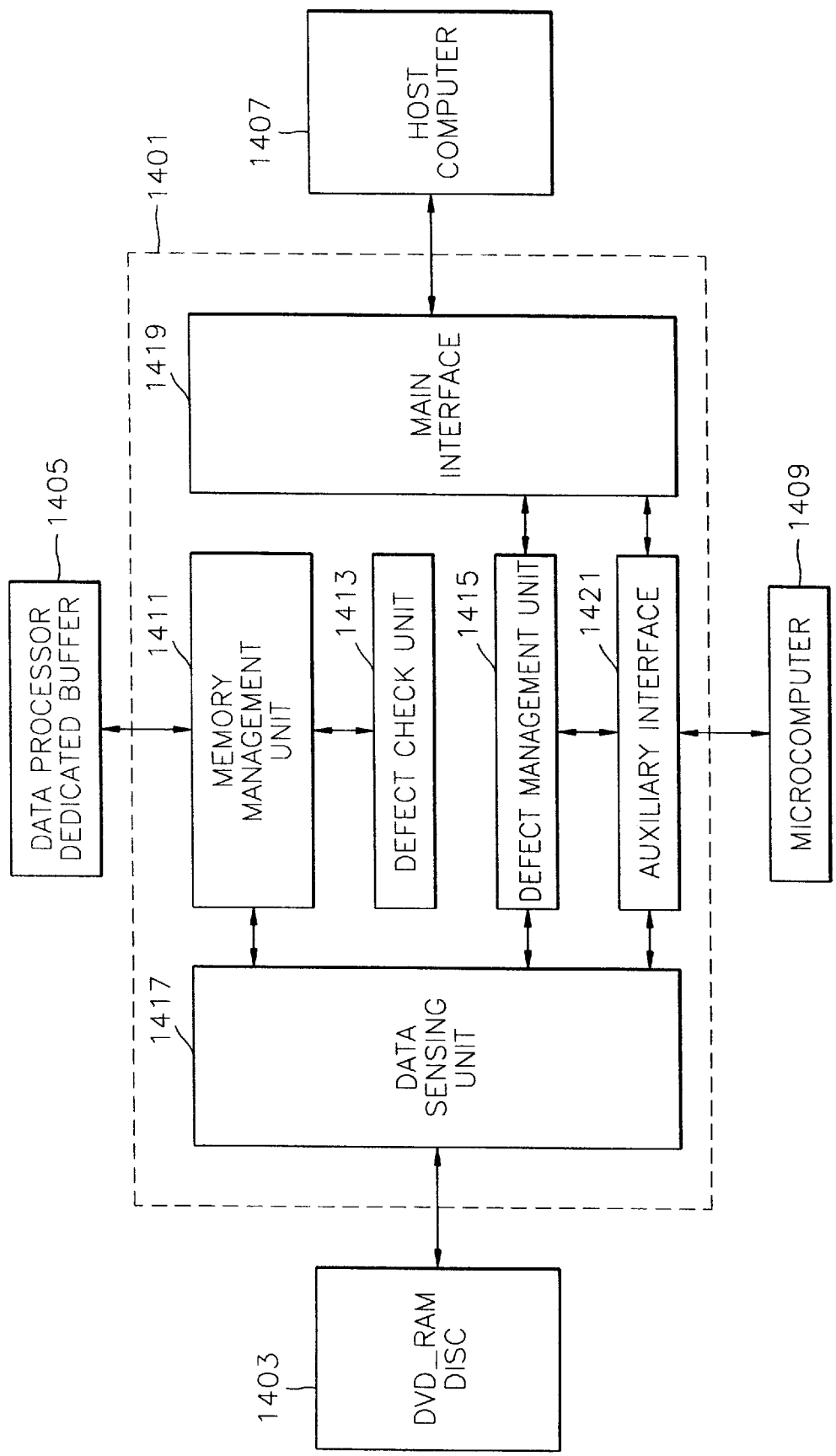
FIG. 14 is a schematic block diagram of a data processor and its peripheral equipment for controlling recording media according to the present invention.

FIG. 14 is a schematic block diagram of one embodiment of a data processor and its peripheral equipment for controlling recording media according to the present invention. The data processor according to the present invention controls a recording medium having a defect management unit and a main data storage unit which record defects which are already generated. Referring to FIG. 14, a data processor 1401 for controlling a recording medium includes a memory management unit 1411, a defect check unit 1413, a defect management unit 1415, and a data sensing unit 1417. The memory management unit 1411 records and stores data in the main data storage unit. The defect check unit 1413 interacts with the memory management unit 1411 and checks defects of main data in the main data storage unit. The defect management unit 1415 manages the defects of the main data storage unit. The data sensing unit 1417 processes the data in the recording medium and communicates with the memory management unit 1411 and the defect management unit 1415.

The auxiliary devices of the data processor 1401 are an information recording disc 1403, a data processor dedicated buffer 1405, a host computer 1407, and a microcomputer 1409. The data processor dedicated buffer 1405 interacts with the memory management 1411 in the data processor 1401 and records data in the DMA capable of being defect corrected in the recording medium. The auxiliary computer 1409 communicates with the data processor 1401 via an auxiliary interface 1421. The host computer 1407 communicates with the data processor 1401 via the main interface 1419.

While this invention has been particularly shown and described with reference to the preferred embodiments thereof, it will be understood by those skilled in the art that various changes in form and details may be made without departing from the spirit and scope of this invention as defined by the appended claims.

What is claimed is:

1. A method of searching for defective addresses of a recording medium, the recording medium having a main data storage unit and a defective data management unit, the defective data management unit having at least one defect management area including first and second defect lists, said method comprising the steps of:
    (a) searching for a defect-correctable defect management area of the defective data management unit;
    (b) recording data in the defect-correctable defect management area which was searched for;
    (c) calculating a temporary physical address by inputting the position of data whose real address is to be searched for as a logical block address;
    (d) searching for the first and second defect lists of the defect management area recorded in step (a), setting the first and second defect lists as input information, and calculating a real physical address by one-half dividing the temporary physical address calculated in the step (c); and
    (e) calculating a real data address from the real physical address.

2. The method of searching for defective addresses of a recording medium as claimed in claim 1, wherein step (c) comprises the steps of:
    (c1) receiving the logical block address of data to be searched for from an external source;
    (c2) producing a temporary data address by adding the received logical block address to a start address of a first block of the main data storage unit;
    (c3) searching for a corresponding group using the temporary data address; and
    (c4) producing a temporary physical address by adding the total number of auxiliary addresses of groups existing before the corresponding group to the number of auxiliary addresses existing before a data block of the corresponding group.

3. The method of searching for defective addresses of a recording medium as claimed in claim 1, wherein step (d) comprises the steps of:
    (d1) calculating a first preliminary address by adding the total number of data units of a replaced group to the number of data addresses in an auxiliary area of the second defect list;
    (d2) comparing the first preliminary address to the temporary physical address;
    (d3) searching for the second defect list and obtaining the real physical address using a one-half dividing method, when the first preliminary address is greater than or equal to the temporary physical address; and
    (d4) searching for the first defect list and obtaining the real physical address using a one-half dividing method, when the first preliminary address is smaller than the temporary physical address.

4. The method of searching for defective addresses of a recording medium as claimed in claim 3, wherein the step (d3) comprises the steps of:
    (d3a) determining whether the first preliminary address is larger than the temporary physical address;
    (d3b) tracking a replacement address equal to the temporary physical address, using a consecutive one-half dividing method, when the first preliminary address is larger than the temporary physical address; and
    (d3c) tracking a real physical address corresponding to the replacement address;
    wherein, when the first preliminary address is smaller than or equal to the temporary physical address, the first preliminary address becomes the replacement address.

5. The method of searching for defective addresses of a recording medium as claimed in claim 3, wherein step (d4) comprises the steps of:
    (d4a) calculating a second preliminary address by adding the number of data addresses of the auxiliary area of the first defect list to the total number of data units;
    (d4b) determining whether the second preliminary address is the same as the temporary physical address;
    (d4c) tracking a replacement address equal to the temporary physical address, using a consecutive one-half dividing method, when the second preliminary address is different from the temporary physical address; and
    (d4d) tracking a real physical address corresponding to the replacement address;
    wherein, when the second preliminary address is the same as the temporary physical address, the second preliminary address becomes the replacement address.

6. A method of searching for a real physical address of a recording medium from a list of addresses in a replacing group of addresses for replacing a defective group of addresses, said method comprising the steps of:
    (a) generating a sum SA by adding a number SOFF of auxiliary addresses to an SN-th address, said number SOFF being the number of data addresses existing in an auxiliary area of a defect list, said SN-th address being the total number of sectors of the replaced groups, and producing a preliminary address being the SA-th address;
    (b) determining whether the preliminary address is larger than a temporary physical address;
    (c) when the preliminary address is larger than the temporary physical address, tracking a replacement address equal to the temporary physical address using a consecutive one-half dividing method; and (d) tracking a real physical address corresponding to the replacement address;

wherein, when the preliminary address is smaller than or equal to the temporary physical address, the preliminary address becomes the replacement address.

7. The method of searching for a real physical address of a recording medium as claimed in claim 6, wherein the step (a) comprises the steps of:
  (a1) searching for a number SOFF1 of auxiliary addresses, the number SOFF1 being the number of data addresses existing in the auxiliary area of the defect list;
  (a2) determining the total number SN of sectors in the replaced groups; and
  (a3) adding SOFF to the SN-th address and setting the sum to be a preliminary address SA.

8. The method of searching for a real physical address of a recording medium as claimed in claim 6, wherein the step (c) comprises the steps of:
  (c1) when the preliminary address is not the same as the temporary physical address, obtaining a number SB by setting k equal to 1 and adding $SN/2^K$ to SOFF;
  (c2) determining whether the SB-th address is the same as the temporary physical address; and
  (c3) when the SB-th address is not the same as the temporary physical address, setting k equal to k+1 and performing one of adding and subtracting $SN/2^K$ and SB;
  wherein, when the SB-th address is the same as the temporary physical address, step (d) is performed.

9. The method of searching for a real physical address of a recording medium as claimed in claim 8, wherein:
  $SN/2^K$ is added to SB when SB is smaller than the temporary physical address; and
  $SN/2^K$ is subtracted from SB when SB is larger than the temporary physical address.

10. A method of searching for defective addresses of a recording medium, the recording medium having a main data storage unit and a defective data management unit, the defective data management unit having at least one defect management area including first and second defect lists, said method comprising the steps of:
  (a) searching for a defect-correctable defect management area of the defective data management unit, performing correction of defects, and writing a defect map table showing the number of data units and the number of accumulated data units in the first and second defect lists of each group;
  (b) recording data in the defect-correctable defect management area which was searched for;
  (c) calculating a temporary physical address by inputting as a logical block address the position of data whose real address is to be searched for;
  (d) determining a corresponding group using the temporary physical address and determining the range of a searching address of the corresponding group in the defect map table;
  (e) searching for the first and second defect lists of the defect management area recorded in step (a), setting the first and second defect lists as input information, and calculating a real physical address by one-half dividing the temporary physical address calculated in the step (c); and
  (f) calculating a real data address from the real physical address.

11. The method of searching for defective addresses of a recording medium as claimed in claim 10, wherein the step (c) comprises the steps of:
  (c1) receiving from an external source the logical block address of data to be searched for;
  (c2) producing a temporary data address by adding the received logical block address to a start address of a first block of the main data storage unit;
  (c3) searching for a corresponding group using the temporary data address; and
  (c4) producing a temporary physical address by adding the total number of auxiliary addresses of groups existing before the corresponding group to the number of auxiliary addresses existing before a data block of the corresponding group.

12. The method of searching for defective addresses of a recording medium as claimed in claim 10, wherein step (e) comprises the steps of:
  (e1) calculating a first preliminary address using (1) the number SOFF of data addresses in the auxiliary area of the second defect list, (2) the number ASNd*y of addresses corresponding to the number ASNd of accumulated data units in the second defect list before the corresponding group in the defect map table, and (3) the number SNd*y of addresses corresponding to the number SNd of data units in the second defect list of the corresponding group;
  (e2) comparing the first preliminary address to the temporary physical address;
  (e3) searching for the second defect list in the corresponding group and obtaining the real physical address using a one-half dividing method, when the first preliminary address is greater than or equal to the temporary physical address; and
  (e4) searching for the first defect list in the corresponding group and obtaining the real physical address using a one-half dividing method, when the first preliminary address is smaller than the temporary physical address.

13. The method of searching for defective addresses of a recording medium as claimed in claim 12, wherein step (e1) comprises the steps of:
  (e1a) setting the number of data addresses in the auxiliary area of the second defect list to be the number SOFF1 of auxiliary addresses;
  (e1b) obtaining ASNd and SNd from the defect map table; and
  (e1c) obtaining a first preliminary address SA1 using the equation SA=SOFF+ASNd*y+Snd*y, where y is the number of defective and replacement addresses with respect to a piece of data.

14. The method of searching for defective addresses of a recording medium as claimed in claim 12, wherein step (e3) comprises the steps of:
  (e3a) determining whether the first preliminary address SA1 is larger than the temporary physical address;
  (e3b) when the first preliminary address is larger that the temporary physical address, tracking a replacement address equal to the temporary physical address, using the consecutive one-half dividing method on the range of the address of the corresponding group determined in step (d);
  (e3c) tracking a real physical address corresponding to the replacement address;
  wherein, when the first preliminary address SA is the same as the temporary physical address, the first preliminary address becomes the replacement address.

15. The method of searching for defective addresses of a recording medium as claimed in claim 12, wherein step (e4) comprises the steps of:

(e4a) calculating a second preliminary address by summing the number POFF of data addresses of the auxiliary area of the first defect list, the number APNd*y of addresses corresponding to the number APNd of accumulated data units in the first defect list before the corresponding group in the defect map table, and the number PNd*y of addresses corresponding to the number PNd of data units in the first defect list of the corresponding group;

(e4b) determining whether the second preliminary address is the same as the temporary physical address;

(e4c) when the second preliminary address is different from the temporary physical address, tracking a replacement address equal to the temporary physical address, using the consecutive one-half dividing method; and (e4d) tracking a real physical address corresponding to the replacement address;

wherein, when the second preliminary address is the same as the temporary physical address, the second preliminary address becomes the replacement address.

16. A processor for controlling a recording medium having a main data storage unit and a defect data management unit for recording defects, comprising:

a memory management unit for recording and storing data in the main data storage unit;

a defect management unit having first and second defect lists for managing defects of the main data storage unit;

a defect check unit which can communicate with the memory management unit for checking the defects of main data of the main data storage unit via the first and second defect lists of the defect management unit; and a data sensing unit for processing data of the recording medium and communicating with the memory management unit and the defect management unit;

wherein the defect check unit obtains a temporary physical address by receiving a logical block address at the position of data whose real physical address is to be searched for, and calculates a real physical address by setting the first and second defect lists as input information and performing a one-half dividing method on the temporary physical address.

17. A processor for controlling a recording medium having a main data storage unit and a defect data management unit for recording defects which are already generated, comprising:

a memory management unit for recording and storing data in the main data storage unit;

a defect management unit having first and second defect lists for managing defects of the main data storage unit;

a defect check unit which can communicate with the memory management unit for checking a corresponding area to search for the defects of main data of the main data storage unit via a defect map table showing the first and second defect lists of the defect management unit, the number of data units in the first and second defect lists in each group, and the number of accumulated data units; and a data sensing unit for processing data of the recording medium and communicating with the memory management unit and the defect management unit;

wherein the defect check unit obtains a temporary physical address by receiving a logical block address at the position of data whose real address is to be searched for, and calculates a real physical address by setting the first and second defect lists as input information and perfonning a one-half dividing method on the temporary physical address.

* * * * *

UNITED STATES PATENT AND TRADEMARK OFFICE
CERTIFICATE OF CORRECTION

PATENT NO. : 6,249,884 B1  
DATED : June 19, 2001  
INVENTOR(S) : Tae-shik Joo

It is certified that error appears in the above-identified patent and that said Letters Patent is hereby corrected as shown below:

<u>Claim 17,</u>
Line 34, please change "perfonning" to -- performing --.

Signed and Sealed this

Twenty-sixth Day of February, 2002

Attest:

Attesting Officer

JAMES E. ROGAN  
Director of the United States Patent and Trademark Office